United States Patent
Rowse et al.

[11] Patent Number: 5,899,055
[45] Date of Patent: May 4, 1999

[54] PULL TYPE RAKE

[75] Inventors: Dan D. Rowse, Ord; Ron A. Rowse, Burwell, both of Nebr.

[73] Assignee: Rowse Hydraulic Rakes Co., Inc., Burwell, Nebr.

[21] Appl. No.: 08/812,234

[22] Filed: Mar. 6, 1997

[51] Int. Cl.⁶ .................................................. A01D 76/00
[52] U.S. Cl. ............................................. 56/377; 56/375
[58] Field of Search .............................. 56/375, 377, 378, 56/380, 379, 384, 397, 15.8, 396, DIG. 10, DIG. 21, 365, 367

[56] References Cited

U.S. PATENT DOCUMENTS

| | | | |
|---|---|---|---|
| 2,532,652 | 12/1950 | Wray, Sr. | 56/377 |
| 2,827,754 | 3/1958 | Hill | 56/377 |
| 2,853,846 | 9/1958 | Plant et al. | 56/377 |
| 3,031,834 | 5/1962 | Van Der Lely et al. | 56/377 |
| 3,070,938 | 1/1963 | Winget | 56/6 |
| 3,220,172 | 11/1965 | Wood | 56/377 |
| 3,332,222 | 7/1967 | Heinlein | 56/377 |
| 4,214,428 | 7/1980 | Caraway | 56/377 |
| 4,352,268 | 10/1982 | Van Der Lely | 56/370 |
| 4,478,032 | 10/1984 | Inskeep | 56/377 |
| 4,974,407 | 12/1990 | Rowe | 56/384 |
| 4,996,833 | 3/1991 | Von Allowerden | 56/380 |
| 5,263,306 | 11/1993 | Tonutti | 56/377 |
| 5,305,590 | 4/1994 | Peeters | 56/377 |
| 5,493,853 | 2/1996 | Tonutti | 56/377 |
| 5,540,040 | 7/1996 | Peeters | 56/377 |
| 5,598,691 | 2/1997 | Peeters | 56/377 |
| 5,685,135 | 11/1997 | Menichetti | 56/377 |

FOREIGN PATENT DOCUMENTS 784308  10/1957  United Kingdom.

OTHER PUBLICATIONS

SITREX Agricultural Machinery, "V" Rakes Magnum MK 10–12/MK 14–16, Perugia, Italy; No Date Available.

*Primary Examiner*—Thomas B. Will
*Assistant Examiner*—Arpad Fabian Kovacs
*Attorney, Agent, or Firm*—Zarley, McKee, Thomte, Voorhees & Sease

[57] ABSTRACT

A "V" type pull rake includes a rigid primary frame to which rake arms are pivoted for movement about vertical and horizontal axes. The rake arms include at their outer ends upstanding posts to which control assemblies are connected and extend over the rake wheels and raked material to the primary frame. The control assembly includes a pair of pivotally interconnected members with the control assembly of each rake arm including two pivotal connections allowing pivotal movement about vertical and horizontal axes. Rake arms extensions are pivotally connected to the outer ends of the rake arms and actuating rods for raising and lowering the rake wheels extend along the rake arms over the pivotal connection to the rake arm extension and include a pivot rod for allowing the actuating rod to function when the rake arm extension is pivoted relative to the rake arm.

11 Claims, 5 Drawing Sheets

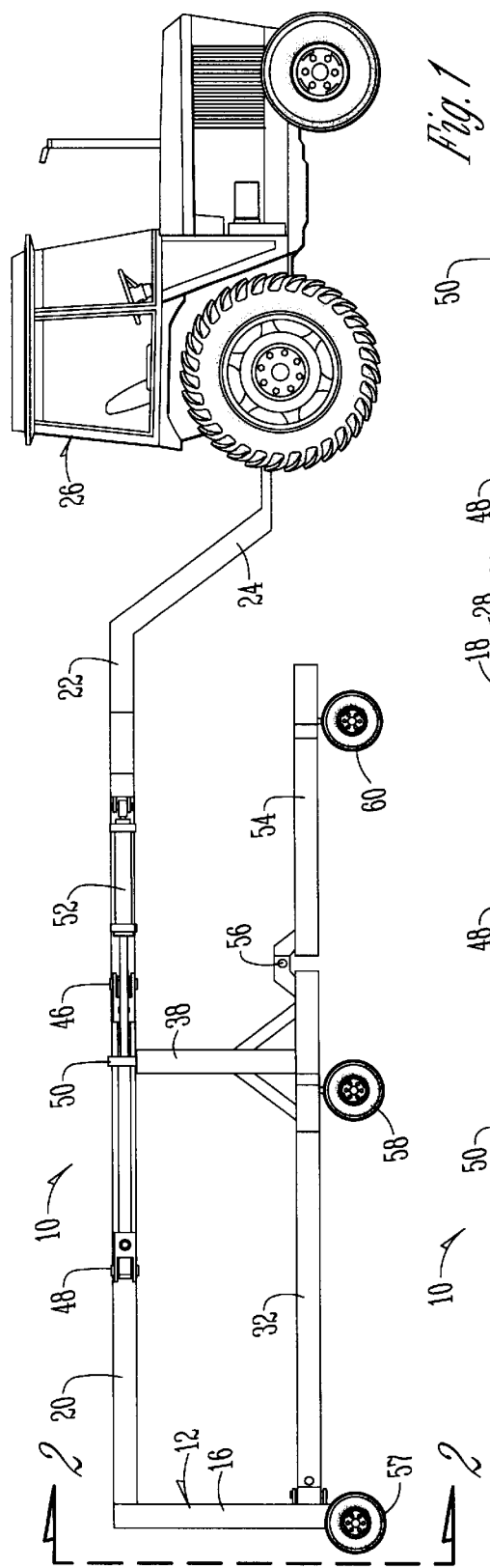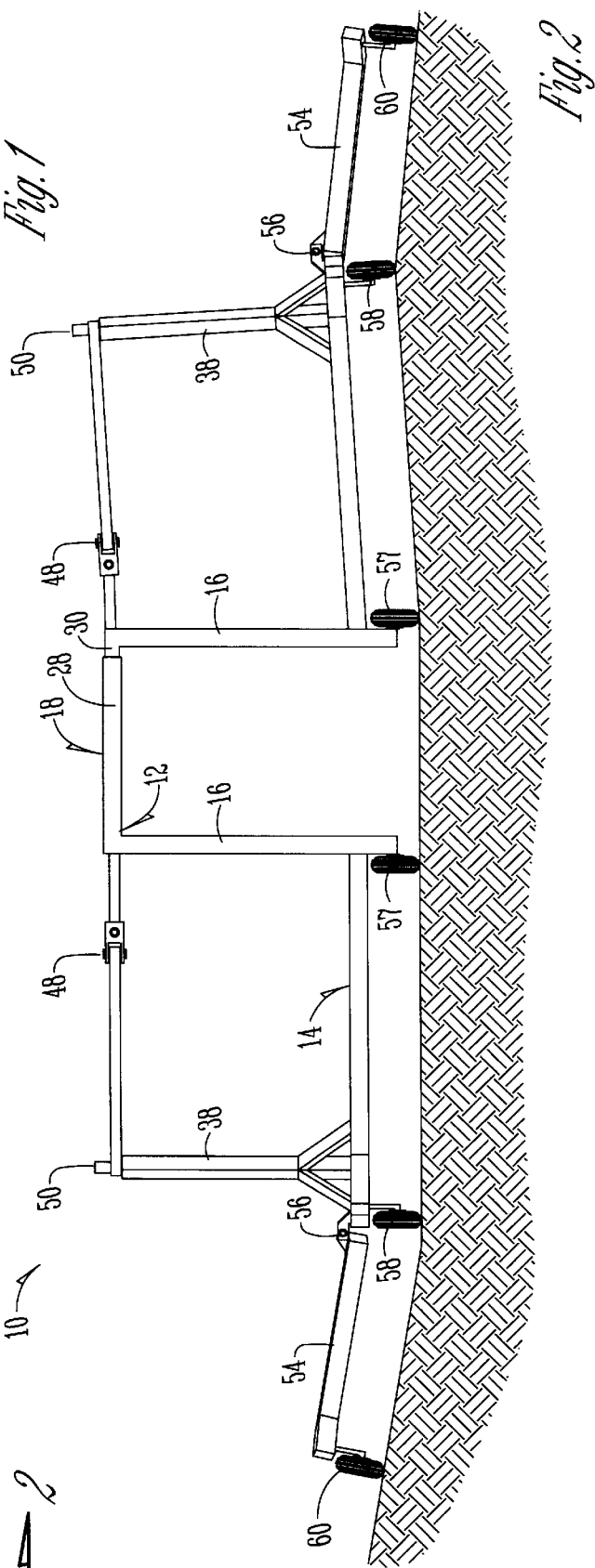

PULL TYPE RAKE

BACKGROUND AND SUMMARY OF THE INVENTION

This invention relates to a pull type rake having a main frame and a pair of secondary frames which are connected to the main frame for movement between a transport closed position and an operative open position.

The rake of this invention is sometimes known as a "V" rake or a bifold rake. Representative of the prior art is the patent to Tonutti U.S. Pat. No. 5,493,853. The rake of this patent involves a control assembly for pivoting the rake arms between their open and closed positions wherein the control assembly is rigidly connected to the rake arm by gusset plates allowing an arm of the control assembly to extend between a pair of rake wheels. It is an object of the present invention to position the control assembly above the rake wheels and allow the rake arms to pivot in such a manner that they can follow the contour of the ground. By positioning the control assembly above the rake wheels, it does not interfere with the rake wheels but also allows larger windrows of raked material to form thereunder.

Another representative "V" type rake is manufactured by Sitrex, Srl. in Perugia, Italy. The control assembly for operating the rake arms is raised above the rake arms but not above the rake wheels and still extends between the rake wheels. A single hydraulic cylinder on either side extends between a post on the rake arm and the center main frame.

A further object of the present invention is to provide a rigid primary frame having a pair rake arms pivoted thereto about horizontal and vertical axes to allow the rake arms to float over the ground and pivot between open and closed positions.

A further object of the present invention is for each of the rake arms to have pivotally connected to their outer ends extension rake arms which will allow the rake wheels to better follow the contour of the ground. A problem associated with the addition of the extension rake arms is providing an actuating rod for raising and lowering the rake wheels which will operate across the hinge connection between the rake arm and the extension rake arm. This problem has been overcome by the present invention through the use of an actuating rod mounted to the rake arm and the extension rake arm across the pivot connection by including a hinge rod which is pivotally interconnected between two actuating rod portions. The hinge rod is positioned across the hinge connection between the rake arm and the rake arm extension such that the hinge rod pivotal connections move alternately between positions coaxial with the axis of the pivotal connection between the rake arm and rake arm extension. Thus, it is seen that the actuating rod can still operate to raise and lower the rake wheels as the rake arm extension pivots up and down as the rake travels over irregular ground.

DESCRIPTION OF THE DRAWINGS

FIG. 1 is a side elevation view of the pull type rake of this invention with the rake arms folded to a closed transport position.

FIG. 2 is a rear elevational view taken along line 2—2 in FIG. 1 showing the rake arms in their open field position.

DESCRIPTION OF THE PREFERRED EMBODIMENT

Figure 3:
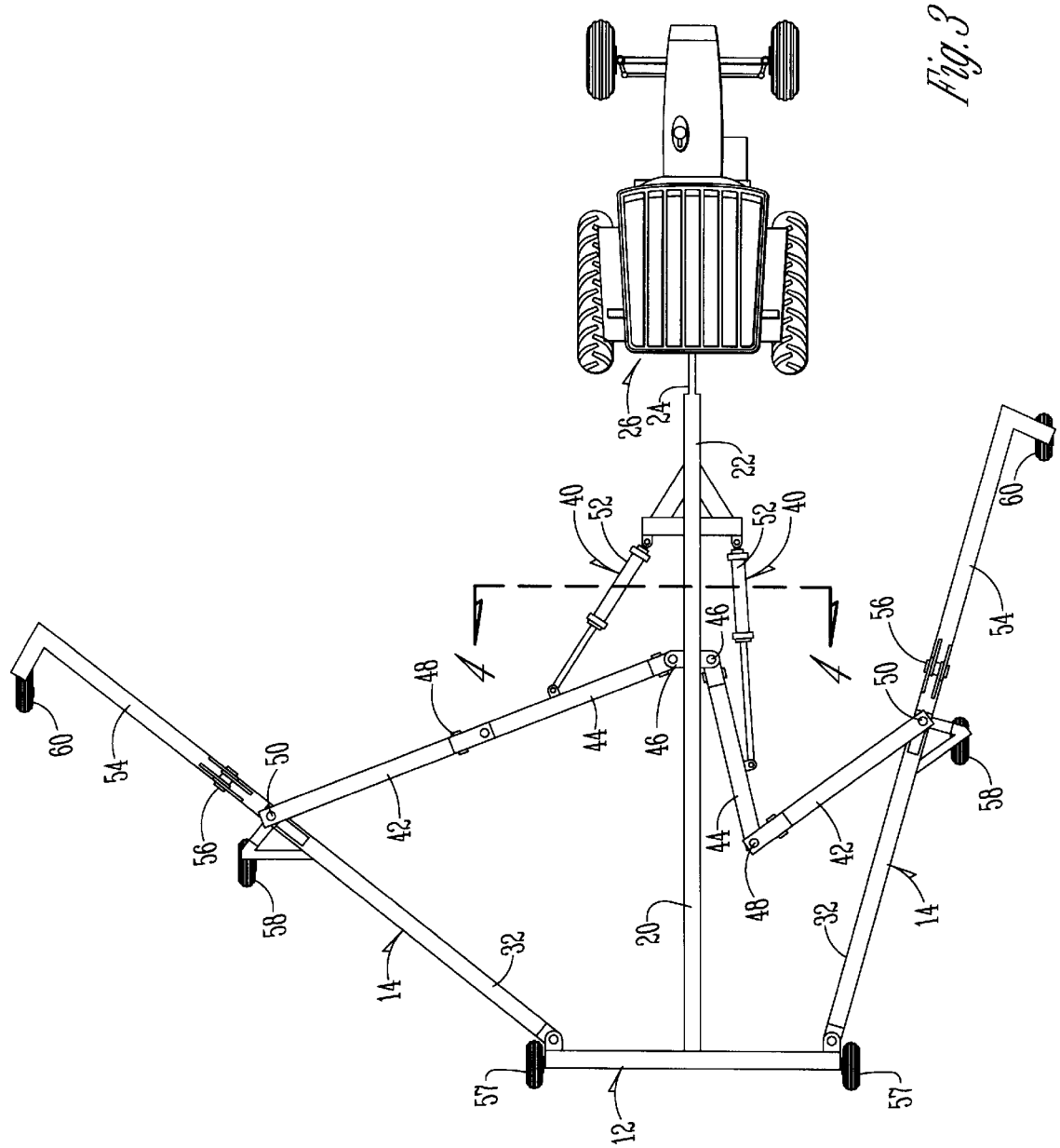
FIG. 3 is a top plan view showing the rake arms in different positions.
Figure 4:
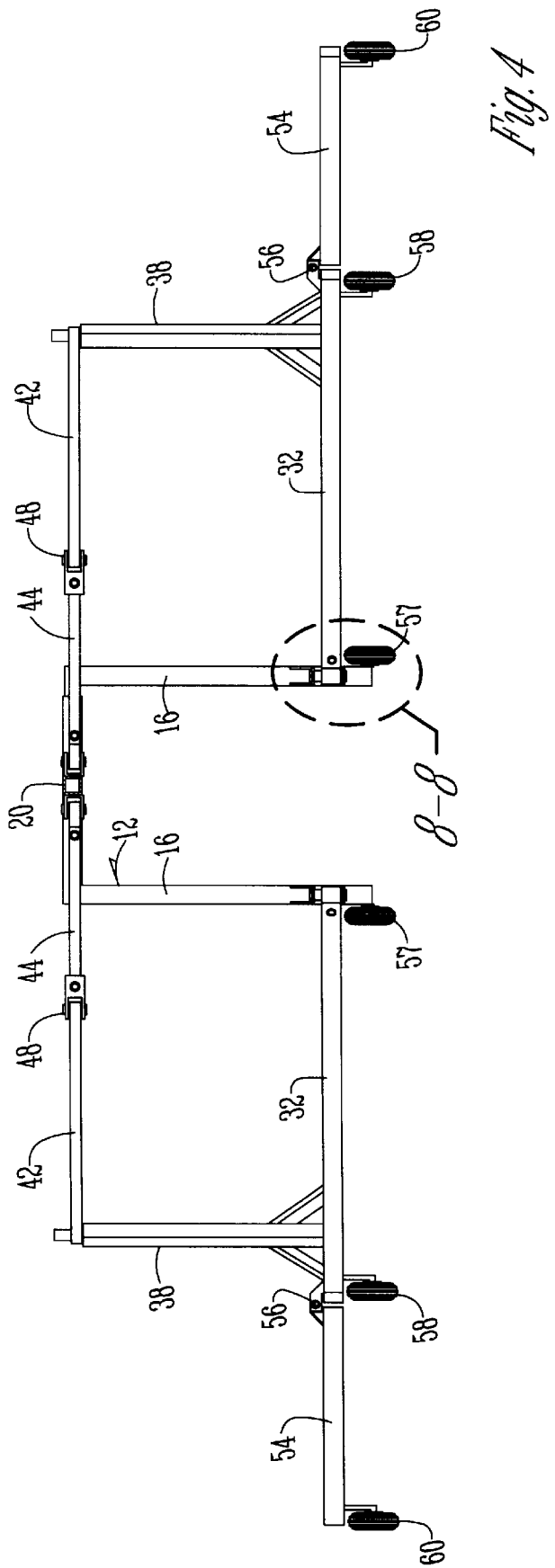
FIG. 4 is an elevational view taken along line 4—4 in FIG. 3 showing the rake arms pivoted to a fully open position.

The pull type rake of this invention is referred to generally in FIG. 1 by the reference numeral 10. It is seen in FIG. 2 that the rake 10 includes a primary frame 12 to which oppositely disposed secondary frames 14 are connected.

The primary frame 12 includes spaced apart vertical frame members 16 rigidly interconnected by a cross frame member 18. A forwardly extending main frame 20 is connected at the center of the cross frame member 18 and terminates at its forward end in an elongated tongue member 22 which is connected through a tongue 24 to a tractor 26. It is seen that the cross frame member 18 is adjustable in width through operation of a telescopic connection between cross frame member portions 28 and 30. The primary frame is otherwise rigid. Each of the secondary frames 14 include rake arms 32 pivotally connected about both vertical and horizontal axes 34 and 36 respectively to the vertical frame member 16 thereby allowing the rake arms 32 to pivot in and out and up and down. This allows the rake arms to follow the contour of the ground and move between open field position and a closed transport position.

The rake arms 32 include upstanding posts 38 at their outer ends to which a control assembly 40 connects the primary frame 12 to the secondary frame 14 for moving the rake arms 32 between open and closed positions.

The control assembly 40 comprises a pair of interconnected members 42 and 44 with the member 44 being connected to the main frame member 20 through a double hinge 46 which allows pivotal movement about both horizontal and vertical axes. A second double hinge 48 interconnects the members 42 and 44 to also allow pivotal movement about both vertical and horizontal axes. A hinge 50 at the outer end of the control assembly 40 connecting it to the post 38 need only allow for pivotal movement about a vertical axis. While two double hinge connections are required in each control assembly is not critical which of the three hinges are double hinges. The control assembly 44 is operated by a hydraulic cylinder 52 which is connected between control assembly member 44 and the main frame 20 as seen in FIG. 3.

The rake arms 32 include rake arm extensions 54 which are pivotally connected to hinges 56 to the outer ends of the rake arms 32 to allow pivotal movement about a horizontal axis thereby permitting the rake arms to follow the contour of the ground as seen in FIG. 2.

Wheels 57, 58 and 60 are provided on the lower ends of the vertical member 16, outer ends of arms 32 and rake arm extensions 54 respectively.

Figure 5:
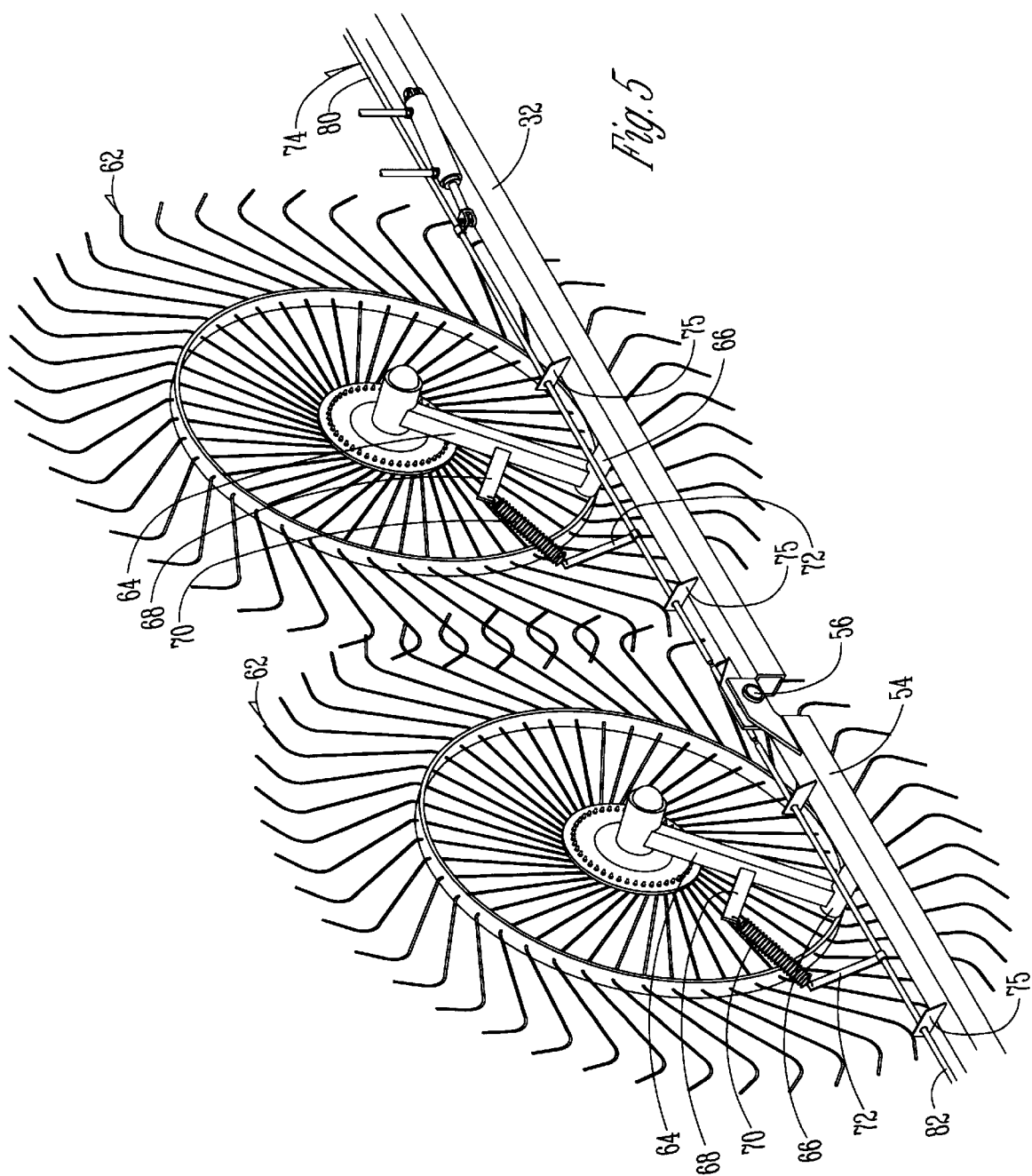
FIG. 5 is an enlarged perspective view of a rake arm including a rake arm extension pivotally connected thereto with both carrying rake wheels and an actuating rod for raising and lowering the rake wheels which operate across a pivotal connection between the rake arm and the rake arm extension.
Figure 6:
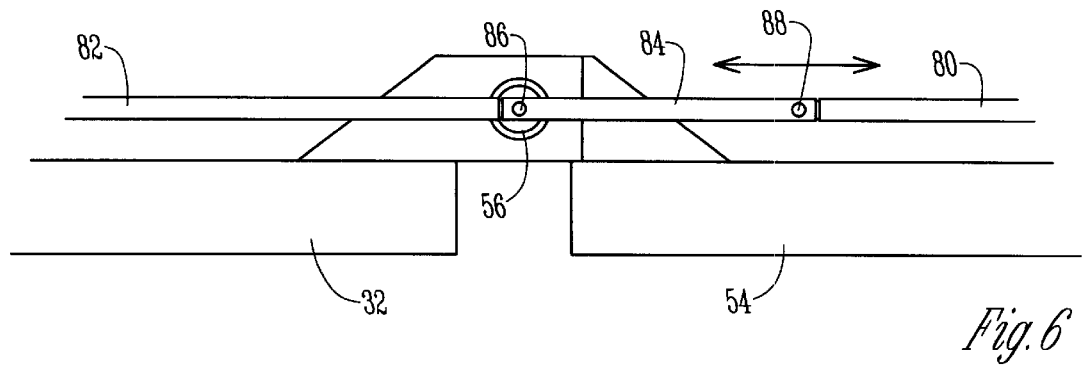
FIG. 6 is a fragmentary side elevational view of the rake arm pivotal connection to the rake arm extension showing the actuating rod moved to the right.
Figure 7:
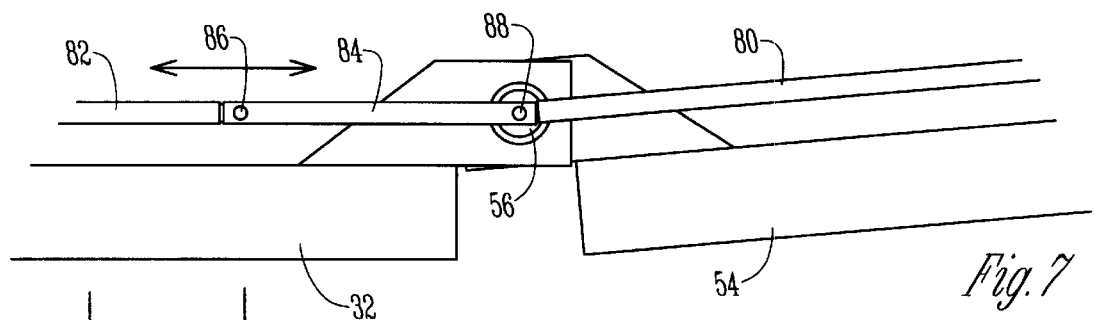
FIG. 7 is a view similar to FIG. 6 but the actuating rod is moved to the left across the pivotal connection between the rake arm and rake arm extension.
Figure 8:
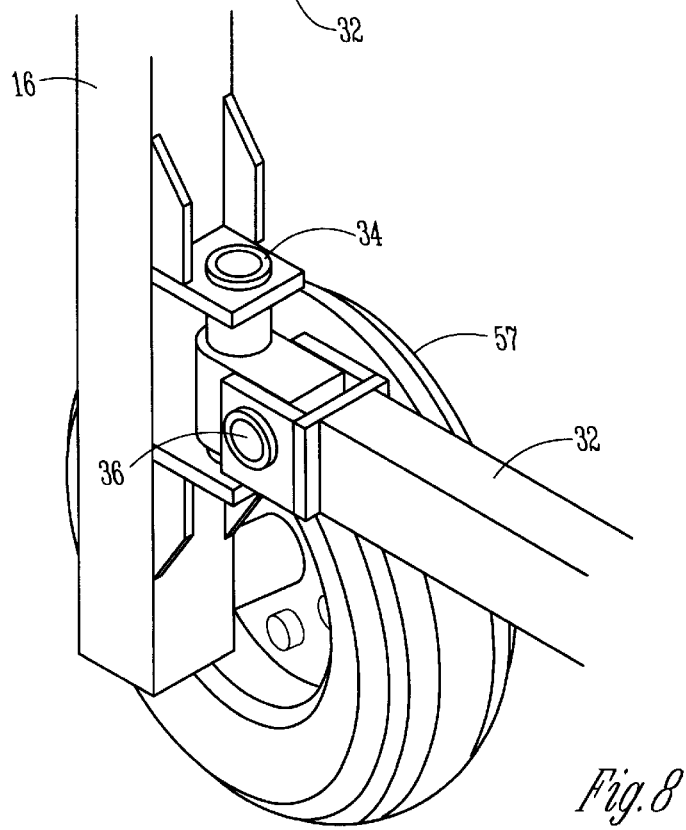
FIG. 8 is a fragmentary perspective view of the hinge connection between the rake arm of the secondary frame and the vertical member of the primary frame wherein the rake arm is free to pivot about vertical and horizontal axes.

In FIG. 5 it is seen that rake wheels 62 are pivotally mounted to the rake arm 32 and rake arm extension 54 through rake wheel arms 64 mounted on pivot shafts 66. A post 68 on the rake wheel arm 64 is connected to one end of a spring 70 in turn connected at its opposite end to a post 72 on an actuating rod 74 mounted to the rake arm 32 and rake arm extension 54 by guides 75. The actuating rod 74 is moveable in opposite directions parallel to the rake arm 32 and rake arm extension 54 across the hinge 56 connecting the rake arm to the rake arm extension 54. The actuating rod 74 includes a pair of rod portions 80 and 82 interconnected by a hinge rod portion 84 as seen in FIG. 6 and 7. The opposite pivotal axes 86 and 88 for the hinge rod 84 are alternately positioned coaxially with the axis of hinge 56 as the actuating rod 74 moves between left and right positions for raising and lowering the rake wheels 62.

It is thus seen that the present invention allows for large rows of raked material to form under the control assembly 40. The control assembly 40 being positioned above the rake wheels and the raked material (not shown) allows for its operation without interference from the raked material or the rake wheels. Each control assembly and rake arm having two double hinges allows for the rake arms to float over the ground and still be operable between opened and closed positions. The rake arm extensions further assure that all material will be raked regardless of the contour of the ground as the rake arm extension will pivot as required to follow the contour of the ground. The rake wheels can be raised and lowered as required as the rake arm extension pivots up and down. This is made possible through the inclusion of a hinge rod in the actuating rod assembly which extends across the pivot hinge interconnecting the rake arm to the rake arm extension.

What is claimed is:

1. A pull type rake comprising,
 a primary frame including a pair of horizontally spaced apart vertical frame members having upper and lower ends, a cross frame member rigidly interconnecting said upper ends and wheels being provided on said lower ends, an elongated main frame member extending forwardly from said cross member and having a tongue for connection at a forward end to a prime mover,
 a secondary frame including an elongated rake arm having an inner and an outer end pivotally connected about vertical and horizontal axes at said inner end to the lower end of each vertical frame member and adapted to pivot between an open laterally extending field position to a closed forwardly extending transport position parallel to said tongue, an upstanding post having upper and lower ends rigidly mounted at its lower end on the outer end of said rake arm,
 rake wheel assemblies mounted on said rake arms in spaced apart relationship along its substantial length, and
 a control assembly connected between said primary frame main frame member and the upper end of said post on each of said rake arms for pivoting said rake arms between said open field position and said closed transport position.

2. The pull type rake of claim 1 wherein said control assemblies each include a pair of pivotally interconnected elongated members with each control assembly including two hinges allowing pivotal movement about horizontal and vertical axes whereby said rake wheels may follow the contour of the ground, and a power means is connected to one of said pair of pivotally interconnected elongated members for operating said control assembly.

3. The pull type rake of claim 1 wherein the outer end of said rake arms includes an extension arm pivotally connected thereto about a horizontal axis and having at least one rake wheel carried thereon which is adapted to follow the contour of the ground.

4. The pull type rake of claim 3 and an actuating rod is mounted on said rake arm and extension arm for slidable movement longitudinally thereof and is operably connected to said rake wheels for causing raising and lowering of said rake wheels, and said actuating rod includes a hinge rod pivotally interconnecting at opposite ends a pair of actuating rod portions, said hinge rod opposite pivotal connections being moveable to positions coaxial with said horizontal axis of the pivotal connection between said rake arm and extension arm whereby said actuating rod is operable throughout the range of relative pivotal movement between said rake arm and extension arm.

5. The pull type rake of claim 1 wherein the control assembly is positioned above the rake wheel assemblies whereby operation of said control assembly is free of interference from said rake wheel assemblies.

6. The pull type rake of claim 5 wherein said control assemblies each include a pair of pivotally interconnected elongated members with each control assembly including two hinges allowing pivotal movement about horizontal and vertical axes whereby said rake wheels may follow the contour of the ground, and a power means is connected to one of said pair of pivotally interconnected elongated members for operating said control assembly.

7. The pull type rake of claim 2 wherein each of said two hinges of each control assembly allows pivotal movement of said elongated members about vertical and horizontal axes.

8. The pull type rake of claim 6 wherein each of said two hinges of each control assembly allows pivotal movement of said elongated members about vertical and horizontal axes.

9. The pull type rake of claim 2 wherein said power means is a hydraulic cylinder for pivoting said elongated members in a horizontal plane for moving said rake arms between said open field position and said closed transport position.

10. The pull type rake of claim 6 wherein said power means is a hydraulic cylinder for pivoting said elongated members in a horizontal plane for moving said rake arms between said open field position and said closed transport position.

11. A pull type rake comprising,
 a primary frame including a pair of horizontally spaced apart vertical frame members having upper and lower ends, a cross frame member interconnecting said upper ends and wheels being provided on said lower ends, an elongated main frame member extending forwardly from said cross member and having a tongue for connection at a forward end to a prime mover,
 a secondary frame including an elongated rake arm having an inner and an outer ends pivotally connected at said inner end to the lower end of each vertical frame member and adapted to pivot between an open laterally extending field position to a closed forwardly extending transport position parallel to said tongue, an upstanding post having upper and lower ends rigidly mounted at its lower end on the outer end of said rake arm, rake wheel assemblies mounted on said rake arms in spaced apart relationship along its substantial length, a control assembly connected between said primary frame main frame member and the upper end of said post on each of said rake arms for pivoting said rake arms between said open field position and said closed transport position, the outer end of said rake arms including an extension arm pivotally connected thereto about a horizontal axis and having at least one rake wheel carried thereon which is adapted to follow the contour of the ground, and an actuating rod being mounted on said rake arm and extension arm for slidable movement longitudinally thereof and being operably connected to said rake wheels for causing raising and lowering of said rake wheels, and said actuating rod including a hinge rod pivotally interconnecting at opposite ends a pair of actuating rod portions, said hinge rod opposite pivotal connections being moveable to positions coaxial with said horizontal axis of the pivotal connection between said rake arm and extension arm whereby said actuating rod is operable throughout the range of relative pivotal movement between said rake arm and extension arm.

* * * * *